Jan. 23, 1962    B. W. QUAIL ETAL    3,017,907
INFLATION EQUIPMENT
Filed Sept. 30, 1959
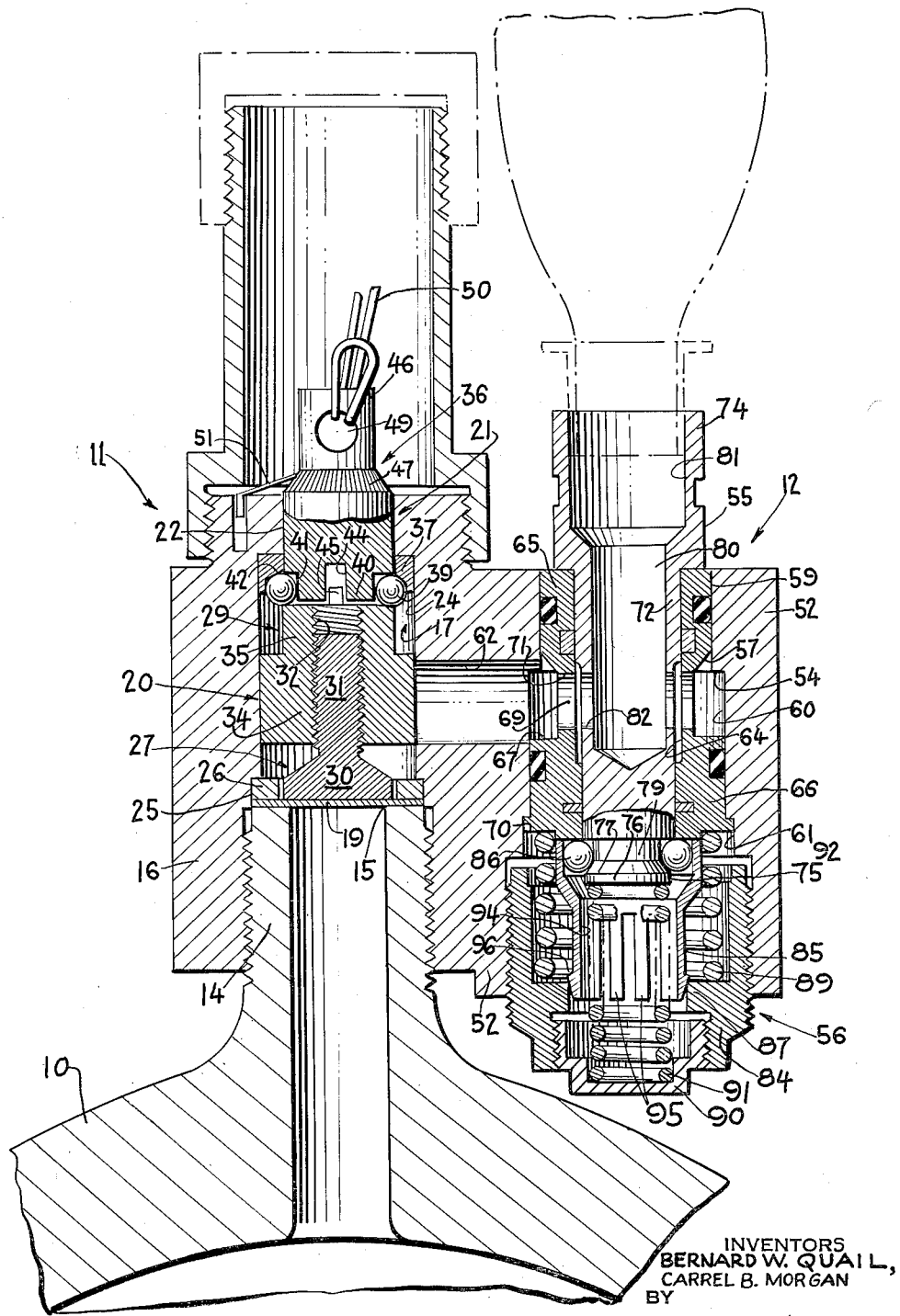
INVENTORS
BERNARD W. QUAIL,
CARREL B. MORGAN
BY
J. William Carson
ATTORNEY

United States Patent Office 3,017,907
Patented Jan. 23, 1962

3,017,907
INFLATION EQUIPMENT
Bernard W. Quail, Scotch Plains, and Carrel B. Morgan, Packanack Lake, N.J., assignors to Specialties Development Corporation, Belleville, N.J., a corporation of New Jersey
Filed Sept. 30, 1959, Ser. No. 843,438
7 Claims. (Cl. 141—197)

The present invention relates to inflation equipment, and, more particularly, to such equipment for inflating emergency devices.

It is well known that an aircraft may be provided with an emergency radio transmitter, which is placed in operation if the aircraft should crash, to aid rescue parties in locating the downed aircraft. It is generally considered advisable that such emergency equipment be ejected from the aircraft either just before or at the time of the crash so that it is not destroyed along with the aircraft. It is also considered advisable that the transmitter package include a balloon which is inflated to carry the transmitting antenna aloft thereby insuring a maximum range of transmission.

It has been recently proposed that the radio transmitter package be projected upwardly from the crashing aircraft and have a parachute attached thereto which automatically opens to pull the package open and initiate the operation of the equipment therein. In this type of an arrangement, it is necessary that the balloon inflation equipment be actuated by the relatively small force by the opening of the parachute and, that after the balloon is inflated, it automatically detaches itself therefrom to permit the antenna to be carried aloft.

Accordingly, it is an object of the present invention to provide improved inflation equipment for the type of emergency device discussed above.

Another object is to provide such equipment which is capable of inflating and releasing a buoyant device in response to a light actuating force.

Another object is to provide inflation equipment which automatically detaches itself from the inflatable device after inflation.

A further object is to provide a pressure actuated fluid conducting coupling device which uncouples when the pressure of the fluid drops below a predetermined value.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

The single FIGURE of the drawing is a longitudinal sectional view of inflation apparatus in accordance with the present invention.

Referring to the drawing in detail there is shown inflation apparatus in accordance with the present invention which generally comprises a cylinder 10 for storing lighter-than-air gaseous medium (e.g. helium) under pressure, a valve 11 mounted on the cylinder 10, and an automatically disconnecting coupling device 12 attached to the valve 11 and adapted to be connected to a balloon or other inflatable device.

The cylinder 10 is formed with an externally threaded neck 14 providing an outlet opening 15 in communication with the interior of the cylinder.

The valve 11 includes a body 16 provided with a stepped bore 17, a burst disc 19, a burst disc supporting assembly 20, and a valve actuating assembly 21.

The stepped bore 17 includes a small diameter upper portion 22, an intermediate diameter central portion 24, and a large diameter lower portion 25 provided with screw threads at the lower end thereof.

The burst disc 19 is positioned over the end of the cylinder neck 14 which is screwed into the bore portion 25 and holds the disc 19 firmly against an annular retainer seal 26 positioned within the bore portion 25 at the upper end thereof, whereby the disc 19 seals the opening 15.

The burst disc supporting assembly 20 is positioned in the central bore portion 24 and includes a disc backup member and a stepped cylindrical adjusting member 29. The backup member 27 has a head 30 in contact with the upper surface of the disc 19 and an upwardly extending threaded stem 31. The adjusting member 29 is provided with a threaded bore 32 receiving the stem 31, and is formed with a lower portion 34 dimensioned to closely fit the central bore portion 24 and an upper portion 35 dimensioned to fit within the upper bore portion 22.

The actuating assembly 21 includes a plug 36 positioned in the upper bore portion 22 and extending downwardly into the central bore portion 24, an annular ball bearing race 37 positioned within the central bore portion 22 at the upper end thereof and having an inner diameter equal to the diameter of the upper bore 22, and plurality of ball bearings 39.

The plug 36 is provided with a small diameter lower portion 40 having a vertical wall 41, and the bearing race 37 is provided with a generally upwardly and inwardly inclined raceway surface 42, the upper edge of which is approximately level with the top of the vertical wall 41. The ball bearings 39 are positioned between the raceway surface 42 and the top of the adjusting member 29, and are held in place by the vertical wall 41 of the plug 36.

A slot 44 formed in the bottom of the plug 36 mates with a projection 45 formed on the adjusting member 29 to allow the backup member 27 to be vertically adjusted by rotation of the plug 36.

The upper end of the plug 36 extends upwardly from the body 16 and is formed with a small diameter end section 46 and a conical intermediate section 47. The end section 46 is provided with a hole 49 for attaching a lanyard 50, and the conical section is provided with longitudinal notches which cooperate with a spring finger 51 attached to the body 16 to prevent the plug 36 from rotating due to vibration.

The automatically disconnecting coupling 12 includes a body 52 integrally formed with the valve body 16 and provided with a stepped bore 54, a nipple 55 positioned in the bore 54 and adapted to be attached to the inflatable device, a latch assembly 56 for holding the nipple 55 within the body 52, and a tubular manifold 57 positioned in the bore surrounding the nipple 55 for operating the latch assembly.

The stepped bore 54 is formed with a small diameter upper portion 59, an intermediate diameter central portion 60 and a large diameter lower portion 61 having screw threads at the lower end thereof. A horizontal passageway 62 extends through the bodies 16 and 52 and connects the central bore portion 60 with the bore portion 24 of the valve.

The tubular manifold 57 is provided with an axial passageway 64 and is formed with an upper section 65 positioned within the bore portion 59, a lower section 66 positioned within the bore portion 60 at the lower end thereof and provided with a horizontal annular surface 67, an intermediate small diameter section 69 positioned within the bore portion 60 at the upper end thereof joining the sections 65 and 66, and a flange 70 extending radially outwardly of the lower section 66 and positioned within the lower bore portion 61 at the upper end thereof. A plurality of horizontal passageways 71 are provided in the intermediate section 69 to provide communication between the horizontal passageway 62 and the axial passageway 64.

The nipple 55 comprises a main cylindrical section 72 positioned within the axial passageway 64 and coextensive therewith. A large diameter cylindrical section 74 positioned externally of the body 52 at the upper end of the section 72, and an extension 75 depending from the lower end of the section 72. The extension 75 includes a cylindrical head 76 spaced from the end of the section 72 and having an upwardly inclined upper surface 77, and a smaller diameter cylindrical stem 79 connecting the head 76 to the section 72. The sections 72 and 74 are provided with axially aligned bores 80 and 81 respectively and the section 72 has a plurality of horizontal apertures 82 placing the bores 80 and 81 in communication with the passageway 71.

The latch assembly 56 is positioned within the lower portion 61 of the bore 54 and includes an externally threaded tubular latch retainer 84 screwed into the bore portion 61, a tubular latch collet 85 positioned within the retainer 84 and surrounding the extension 75, and a plurality of ball bearings 86 positioned between the collet and the extension 75. The retainer 84 is provided with a radially inwardly extending annular flange 87 adjacent the lower end thereof and a helical spring 89 seated on the upper surface of the flange bears upwardly against the lower surface of the manifold 57. The opening at the bottom of the tubular retainer is closed by a cup-shaped member 90, and a helical spring 91 seated on the member 90 bears upwardly against the lower surface of the head 76.

The collet 85 is formed with a large diameter upper section 92 surrounding the extension 75, and a small diameter lower section 94 divided into a plurality of vertical spring finger positions 95 extending downwardly toward the flange 87 and each provided with a barb 96 on the outer surface of the end thereof. The ball bearings 86 are positioned between the collet section 92 and the head surface 77 and lock the nipple 55 and the manifold 57 together.

To condition the inflation apparatus for operation, the apparatus is assembled in the condition shown in the drawing and the disc backup head 30 is placed in tight abutment with the disc 19 by rotating the plug 36 which in turn rotates the adjusting member 29 through the interaction of the slot 44 and the wall 40. The container 10 is then filled with helium (or other lighter-than-air gas) through a filling port (not shown) in the wall of the wall of the container to a pressure greater than that which the burst disc can confine without support. The mouth of the balloon or other inflatable device (which is equipped with a non-return valve) is then attached to the section 74 of the nipple 55 and the apparatus may be placed in a transmitter package adapted to be ejected from an aircraft and having a parachute thereon attached to the lanyard 50 to exert a force on the lanyard upon opening.

In operation, in response to a slight axial pull on the lanyard 50 the plug 36 slides upwardly out of the bore portion 22 and separates from the valve 11. The upward force exerted by the pressurized gas through the burst disc 19 to the disc supporting assembly 20 causes the ball bearing 39 to move inwardly releasing the disc supporting assembly 20 for vertical movement. The disc 19, since it is no longer supported by the assembly 20, ruptures allowing gas to flow into the bore portion 24 forcing the assembly 20 upwardly to uncover the passageway 62. The gas then flows through the passageway 62 into the bore portion 60, through the horizontal passageways 71 and the apertures 82 into the axial bore 80, and thence through the bore 81 into the inflatable device.

The pressure of the gas in the bore portion 60 and the bore 80 acts against both the piston surface 67 and the bottom of the bore 80 to force the manifold 57 and the nipple 55 downwardly as a unit against the springs 89 and 91 carrying with them the latch collet 85. As the manifold 65 and the nipple 55 move downwardly the spring fingers 95 bend inwardly as the barbs 96 pass the flange 87 and thereafter spring outwardly again positioning the barbs under the flange.

When the pressure of the gas in the bore portion 60 drops to a predetermined value, the springs 89 and 91 move the manifold 57 and the nipple 55 upwardly away from the latch collet 85 which is prevented from moving upwardly by the engagement of the barbs 96 with the lower face of the flange 87. The ball bearings 86 are forced upwardly by the motion of the surface 77 until they clear the upper end of the collet 85. The bearings 86 then fall away from the extension 75 unlocking the nipple 55 from the manifold 57 and allowing the spring 91 and the weight of the apparatus to strip the nipple 55 from the bore 64 thus separating the inflatable device, with the nipple 55 attached thereto, from the remainder of the inflation apparatus.

From the foregoing, it will be seen that the present invention provides improved inflation apparatus which is capable of inflating and releasing a buoyant device in response to a light actuating force and includes a pressure actuated fluid conductive coupling device which uncouples when the pressure of the fluid drop below a predetermined value.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. Apparatus for inflating an inflatable unit comprising in combination means providing a limited supply of gaseous medium under pressure; a valve attached to said supply means to initiate the flow of gas from said supply means; and a device for disconnecting the inflatable unit from said supply means and said valve when the pressure of the gas flowing to the unit from said supply means decreases to a predetermined value, said device including a member adapted to be attached to the valve, a second member adapted to be attached to the inflatable unit, said members being separably united, means for latching said members against separation, means responsive to the pressure of the gaseous medium for placing said latch means in unlatching condition and holding said latch means latched when said pressure is of a predetermined value, and means for operating said latch means to unlatch said members in response to a decrease in said pressure below a predetermined pressure.

2. Apparatus for inflating an inflatable unit comprising in combination means providing a limited supply of gaseous medium under pressure; a valve connected to said supply means to initiate the flow of gas from said supply means; and a device for conducting gaseous medium from said valve to the inflatable unit and for disconnecting the inflatable unit from the valve when the pressure of the medium supplied decreases to a predetermined value, said device including a member adapted to be attached to the valve and having a passageway therein adapted to receive the fluid medium from the valve, a second member adapted to be attached to the inflatable unit and having a passageway therein adapted to deliver fluid medium to the unit, said members being separably united with said passageways in fluid flow communication with each other, means for latching said members against separation, means responsive to the pressure in said passageways for placing said latch means in unlatching condition and holding said latch means latched when said pressure is high, and means for operating said latch means to unlatch said members in response to a decrease in said pressure below a predetermined pressure.

3. A device for disconnecting from a unit being supplied fluid medium under pressure the source supplying the pressurized medium when the pressure of the medium supplied decreases to a predetermined value comprising in combination a first member adapted to be attached to the source, a second member separably united to said first member and adapted to be attached to the unit being supplied, means for latching said members against separation, means responsive to the pressure of the source for placing said latch means in unlatching condition and holding said latch means latched when said pressure is high, and means for operating said latch means to unlatch said members in response to a decrease in said pressure below a predetermined pressure.

4. A device for disconnecting from a unit being supplied fluid medium under pressure the source supplying the pressurized medium when the pressure of the medium supplied decreases to a predetermined value comprising in combination a first coupling member adapted to be attached to the source and having a passageway therein adapted to receive the fluid medium from the source, a second coupling member adapted to be attached to the unit being supplied and having a passageway therein adapted to deliver fluid medium to the unit, said members being united, but reciprocally separable, with said passageways in fluid flow communication with each other, means for latching said members against separation, means responsive to the pressure in said passageways for placing said latch means in unlatching condition and holding said latch means latched when said pressure is high, and means for operating said latch means to unlatch said members in response to a decrease in said pressure below a predetermined pressure.

5. Apparatus according to claim 4 wherein said first coupling member and said second coupling member each have a surface disposed at an angle with respect to the reciprocating direction, said surfaces being spaced from each other along the line of reciprocation and said latching means being operable upon said surfaces to latch said coupling members against separation.

6. Apparatus according to claim 5 wherein said latching means include a locking member adapted to be positioned between said surfaces and means moveable with respect to said coupling members for normally holding said locking member between said surfaces.

7. Apparatus according to claim 6 including means for engaging said locking member holding means against movement, piston means on one of said coupling members for moving said coupling members and said holding means toward said engaging means to effect engagement between said engaging means and said holding means, and means for moving said coupling members away from said holding means to allow said locking member to be displaced from between said surfaces to unlatch said coupling members.

References Cited in the file of this patent
UNITED STATES PATENTS

| | | |
|---|---|---|
| 2,041,735 | Young | May 26, 1936 |
| 2,320,111 | Wore | May 25, 1943 |
| 2,452,256 | Muller | Oct. 26, 1948 |
| 2,462,477 | Edwards | Feb. 22, 1949 |
| 2,861,821 | Harter | Nov. 25, 1958 |
| 2,862,531 | Walker | Dec. 2, 1958 |